United States Patent [19]

De Coene

[11] 4,062,366
[45] Dec. 13, 1977

[54] RETHRESHER

[75] Inventor: Frans J. G. C. De Coene, Zedelgem, Belgium

[73] Assignee: Sperry Rand Corporation, New Holland, Pa.

[21] Appl. No.: 699,113

[22] Filed: June 23, 1976

[30] Foreign Application Priority Data

June 26, 1975 United Kingdom ............... 27066/75

[51] Int. Cl.² ............................................. A01F 12/18
[52] U.S. Cl. .................................................... 130/27 F
[58] Field of Search ........................... 130/27 F, 27 R; 56/14.6

[56] References Cited

U.S. PATENT DOCUMENTS

| | | | |
|---|---|---|---|
| 1,406,394 | 2/1922 | Junkin | 130/27 F |
| 2,309,736 | 2/1943 | Makin | 130/27 F |
| 2,875,768 | 3/1959 | Belkowski et al. | 130/27 F |
| 3,976,084 | 8/1976 | Weber | 130/27 F |

Primary Examiner—Russell R. Kinsey

Attorney, Agent, or Firm—Frank A. Seemar; John B. Mitchell; Joseph A. Brown

[57] ABSTRACT

A harvesting machine is provided with a separate improved rethresher for rethreshing tailings to thereby increase the overall efficiency of the machine. The rethresher comprises a rotor rotatably mounted within a cylindrical casing which cooperates with stationary threshing members on the inner curve wall of the casing to rethresh tailings supplied thereto. The casing is provided with internal spiral fins to effect movement of the rethresh tailings generally actually towards a transition opening in a common wall which is located at the inlet opening of the casing and serves as shield for preventing the tailings from being discharged prematurely from the casing. Further provided, is an impeller rotor mounted within a cylindrical casing adjacent the rethresher casing. The impeller rotor is co-axial with the rethresher rotor and is adapted to receive rethresh tailings from the rethresher rotor through the transition opening to discharge rethresh tailings substantially and gently through the impeller casing outlet.

7 Claims, 3 Drawing Figures

RETHRESHER

BACKGROUND OF THE INVENTION

1. Field of the Invention

The present invention relates to harvesting machines (such as combine harvesters) and has particular reference to tailings rethresher means in such machines.

While the terms "grain" and "straw" are used principally throughout this specification for convenience it should be understood that the terms are not intended to be limiting. Thus, "grain" refers to that part of the crop material which is threshed and separated from the discardable part of the crop material which is referred to as "straw".

2. Description of the Prior Art

In known combine harvesters, grain is threshed and separated in a threshing and separating mechanism and the separated grain, together with impurities of all kinds, such as chaff, dust, straw particles, tailings (incompletely threshed ears), is fed to a cleaning mechanism for cleaning. Clean grain is collected there-below and fed to a grain tank for temporary storage. The tailings are separated from the clean grain and impurities for reprocessing. In some known combines, this reprocessing means recycling the tailings through the threshing, separating and cleaning means. However, during recent years, the size, and more especially the capacity of combines have increased. This means that the threshing, separating, and cleaning means have to be capable of handling considerably increased volumes of crop material. With the present large capacity machines, even small percentages of tailings still represent a considerable volume. Recycling these volumes of tailings through the threshing, separating and cleaning means often leads to an uneven loading and/or an overloading of the various components both of which are disadvantageous as both ultimately result in considerable losses.

For recycling the tailings through the threshing means, commonly a paddle-type tailings elevator is provided between the cleaning mechanism and the threshing means. This elevator is normally relatively large and hence relatively expensive.

In other known combine harvesters, independent tailings rethreshers have been provided which are normally arranged to receive the tailings from the cleaning mechanism and to discharge the rethreshed tailings to a grain pan of the cleaning mechanism for recycling the tailings through this cleaning mechanism. The provision of separate tailings re-threshing means of this type is advantageous in as far as the main threshing mechanism can be used to its full capacity without any risks for unevenly loading or overloading it with tailings. These separate tailings rethreshers have proved advantageous especially in combination with high capacity combines since they enable components to operate with a maximum efficiency. Nevertheless, these separate tailings rethreshers have some disadvantages the main one of which is that certain embodiments are complicated and hence expensive. One such embodiment combines a conventional type elevator with rethresher means. Another embodiment combines rethresher means with a vertical auger for feeding the tailings to the rethresher on top thereof. The latter structure is driven via a drive transmission including conical gears which adds to the expense.

All known tailings rethreshers comprise a rotor cooperable with stationary elements to rethresh the tailings, on the one hand, and operable to discharge the rethreshed tailings and spread them substantially evenly over a grain pan of the grain cleaning means for recycling through the latter, on the other hand. Therefore, the design of the rotor has been a compromise so as to fulfil both functions to an acceptable degree.

In operation, the rotor moves the tailings over an aggressive surface thereby effecting rethreshing. The aggressive surface in some of the known tailings rethreshers extends only over a small arc so as to accommodate an inlet and an outlet opening. Thus the efficiency of such a rethresher is relatively low. In other arrangements, the aggressive surface is larger but the rotor is incapable of moving the tailings over the entire surface, whereby the maximum efficiency is not realized.

Another disadvantage is that the tailings are supplied to the tailings rethresher rotor, either co-axially or in a direction generally parallel to the rotor axis. Thus the tailings are not evenly spread over the entire width of the rethreshing rotor and the associated aggressive surface which again reduces efficiency.

Summary of the Invention

According to the present invention a harvesting machine comprises separate tailings rethresher means for rethreshing tailings, separate impeller means for impelling rethreshed tailings to a further component of the machine and conveyor means for conveying rethreshed tailings from the rethresher means to the impeller means.

Preferably, the rethresher means comprises a rotor fitted with threshing members and mounted in a cylindrical casing, and the conveyor means are in the form of fins so mounted on the inner wall of the casing as to effect movement of the tailings generally axially of the rotor in operation of the machine. An inlet may be provided in the curved wall of the rethresher casing a further portion of which is provided with a stationary aggressive threshing member cooperable with the threshing members on the rotor, and a still further portion of which has the conveyor fins mounted thereon. Desirably, the stationary threshing member subtends an angle of at least 90° at the axis of the rethresher rotor.

The first impeller means may be arranged coaxially with the rethresher rotor and may be mounted in a cylindrical casing separate from the rethresher casing, with the impeller casing having an inlet opening positioned so as to receive rethreshed tailings generally axially from the rethresher casing. The impeller casing may have a discharge opening through which rethreshed tailings are discharged generally tangentially of the casing to a further component of the machine. In a preferred embodiment, the rethresher casing and impeller casing have a common wall in which the inlet to the impeller casing is provided and which also serves to shield tailings being rethreshed from being discharged prematurely to the first impeller means. Also, the machine further comprises a cleaning mechanism and a tailings auger for conveying tailings collected in the cleaning mechanism to the rethresher means, the tailings auger having second impeller means mounted thereon and operable to propel tailings generally tangentially to an inlet located towards the bottom of the rethresher casing.

In the Drawings

A combine harvester embodying the present invention will now be described in further detail, by way of example, with reference to the accompanying drawings, in which.

DETAILED DESCRIPTION OF THE PREFERRED EMBODIMENT

Figure 1:
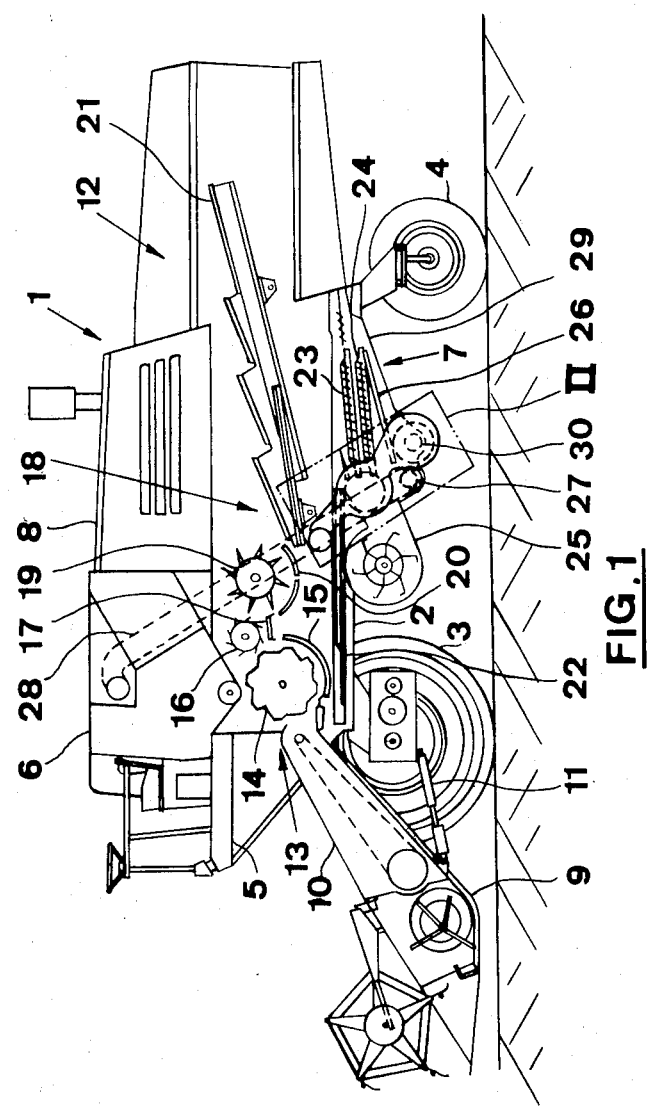
FIG. 1 is a schematic side view of the combine harvester.

With reference to FIG. 1, the combine embodying the present invention is generally indicated at 1 and comprises a main frame 2 supported on a pair of drive wheels 3 and a pair of steerable wheels 4, only one wheel of each pair being shown. Supported on the main frame 2 are an operator's platform 5, a grain tank 6, a grain cleaning mechanism 7, and an engine 8. A conventional header 9 and feed conveyor 10 extend forwardly of the machine and are pivotally secured to the frame 2 for general vertical movement which is controlled by extensible hydraulic cylinders 11. The main frame 2 also supports a threshing and separating mechanism generally indicated at 12. The threshing portion 13 of the mechanism 12 comprises a conventional rotatable thresher cylinder 14 cooperable with a conventional stationary thresher concave 15, the operation of which is well known in the art. Rearwardly of the thresher cylinder 14 and the thresher concave 15, there is provided a conventional deflector or a so-called straw-beater 16 with a cooperable grate 17. Rearwardly of the straw beater 16, a separating mechanism 18 is provided which comprises at its forward end a separating cylinder 19 and a cooperable concave 20 and at its rearward end, conventional straw walkers 21. The cleaning mechanism 7 extends generally below the threshing and separating mechanism 12 and comprises at its forward end a grain pan 22 and at its rearward end, cleaning sieves 23 and 24.

A cleaning fan 25, is provided forwardly of the cleaning sieves 23, 24 and underneath the grain pan 22, and is arranged to direct an air blast from below to the cleaning sieves 23, 24.

Figure 2:
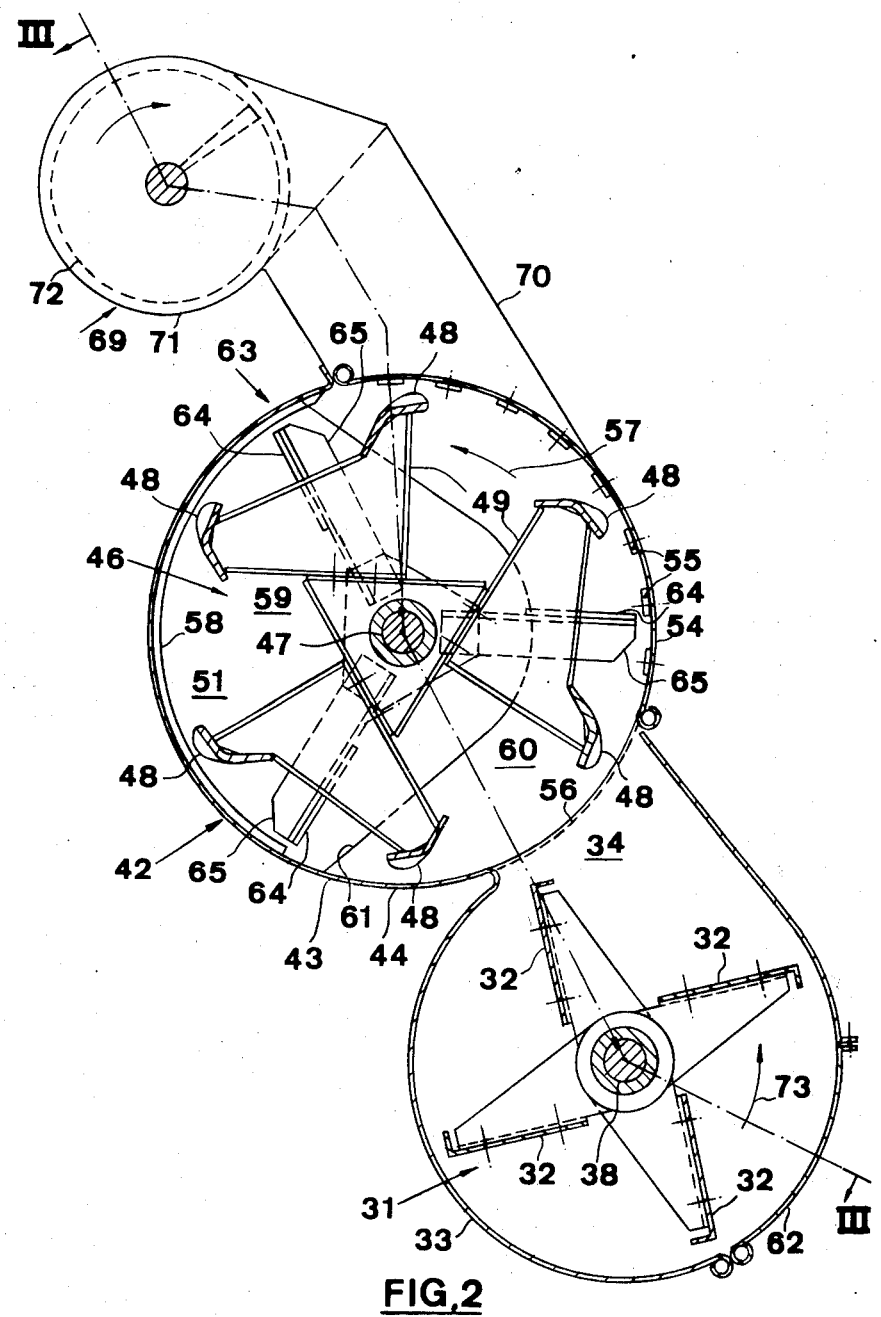
FIG. 2 is a sectional view on a larger scale of the portion indicated at II in FIG. 1.
Figure 3:
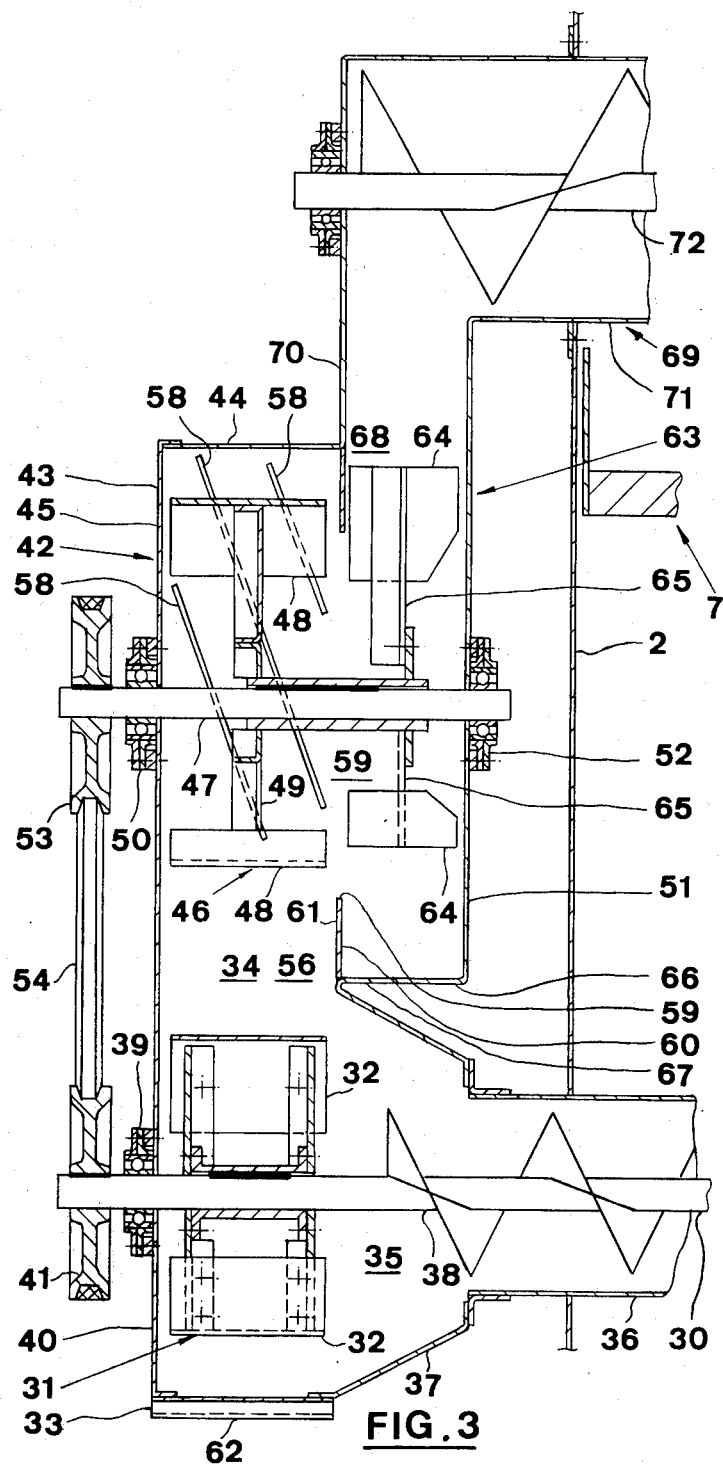
FIG. 3 is a sectional view taken along the line III—III of FIG. 2.

A separate tailings rethresher mechanism 42 is provided on the machine and will be described with particular reference to FIGS. 2 and 3. The tailings auger 30 supports adjacent one end an impeller rotor 31 with impeller blades 32 arranged inside an impeller housing 33. The impeller housing 33 is generally cylindrical in shape and has an upwardly-facing discharge opening 34 in its periphery which is generally of the same width as the impeller housing 33 and the associated rotor 31. The impeller housing 33 also has an inlet opening 35 coaxially with its rotor axis and connected to a tailings auger trough 36 via a transition 37 flaring towards the impeller. Finally, the housing 33 also comprises a removable section 62 to allow access to the rotor 31 when necessary. The auger shaft 38 is supported in a bearing 39 on a side wall 40 of the housing 33 and carries at its outer end a pulley 41.

The tailings rethresher mechanism 42 is positioned generally above the impeller housing 33 and comprises a housing 43 which is generally cylindrical in shape and has a main curved wall 44 and a flat side wall 45. The side wall 45 is coplanar with the impeller side wall 40. The rethresher housing 43 further supports a rethresher rotor 46 with a rotor shaft 47 and rasp bars 48 secured thereto via supports 49. The rethresher rotor shaft 47 is supported at one side on the side wall 45 in a bearing 50 and at its other end on a wall 51 in a bearing 52. The shaft 47 supports a pulley 53 coplanar with the pulley 41. A drive belt 54 extends around both pulleys 41, 53.

The rethresher housing 43 comprises an aggressive thresher surface 54 in the form of an arcuate member having transversely-extending, spaced bars 55 on the inner side thereof. The aggressive thresher surface 54 subtends an angle of at least 90° at the axis of the rotor 46 and may be made radially adjustable and removable. The rethresher housing 43 has a downwardly-facing inlet opening 56 forwardly or upstream of the aggressive threshing surface 54 when seen in the direction of rotation 57 of the rotor 46. The rethresher inlet opening 56 has substantially the same width as the impeller discharge opening 34 to which it is connected. The rethresher rotor 46 has generally the same width as the impeller rotor 31.

The rethresher housing 43 further comprises at the inner side of its cylindrical wall 44 and rearwardly or downstream of the aggressive threshing surface 54 a number of radially inwardly extending part-spiral fins 58. These spiral fins 58 are inclined towards a rethresher discharge opening 59 when seen in the direction of rotation 57 of the rotor 46.

The rethresher discharge opening 59 is provided in a rethresher side wall 60 opposite to the side wall 45 and is defined on the one hand between the cylindrical wall 44 at the location of the aforementioned fins 58 and on the other hand by a wall section 61 extending perpendicularly to, and inwardly of, the cylindrical wall 44 at the location of the rethresher inlet opening 56 and the aggressive threshing surface 54 and extending inwardly over approximately half the radius of the cylindrical wall 44.

The rethresher rotor shaft 47 further supports at a location adjacent the rethresher rotor 46, an impeller rotor 63 with impeller blades 64 mounted on supports 65. The impeller rotor 63 has a diameter which generally corresponds with the diameter of the rethresher rotor 46 and is mounted in a cylindrical impeller housing 66 with a cylindrical wall 67 and a flat side wall 51. The impeller housing 66 is connected to the rethresh outlet 59 at its side opposite to the side wall 51 and further comprises an upwardly-facing discharge opening 68 in its cylindrical wall 67. The width of the discharge opening 68 generally corresponds to the width of the impeller rotor 63. The discharge opening 68 is connected to auger type conveyor means 69 via a duct 70. The conveyor means 69 has an auger trough 71 with an auger 72 therein and extends inwardly of the machine to a location above the grain pan 22.

OPERATION

In operation, the standing crop is cut by a cutter mechanism at the forward end of the header 9 and is fed through the elevator 10 to the threshing and separating mechanism 13, 18 which operate to thresh the crop and separate the grain from the straw. The mat of crop material is discharged by the separating cylinder 19 onto the straw walkers 21 and conveyed rearwardly thereover whilst further grain is separated from the straw mat. The straw is finally discharged onto the ground at the rearward end of the straw walkers 21. All separated grain is conveyed to the cleaning mechanism 7, together with all kinds of impurities such as chaff, dust, straw particles and tailings. All this material received upon the grain pan 22 is conveyed thereby in a rearward direction to the cleaning sieves 23, 24. The cleaning sieves 23 and 24 and the cleaning air fan 25 are arranged to discharge impurities such as chaff, dust, etc. in a rearward direction onto the ground, while collecting cleaned grain on a clean grain collecting chute 26 for conveying to a clean grain auger 27 which further conveys the grain via an elevator 28 to the grain tank 6 for temporary storage therein. The tailings (this means incompletely threshed ears) are separated from the clean grain, on the one hand, and other discardable material, on the other hand, at the rearward end of the cleaning mechanism 7 and are collected on a tailings collecting chute 29 for conveying the same to a tailings auger 30. The operation of a combine harvester as briefly described above is well known in the art and therefore a further detailed description is not necessary.

The tailings auger 30 is driven in the direction 73. Hence the impeller 31 is driven in the same direction and the rethresher rotor 46 and the impeller rotor 63 are driven in the direction 57 via the belt transmission 54. The tailings auger 30 feeds the tailings collected in the cleaning device 7 (and more particularly collected on the tailings collecting chute 29) to the impeller 31. The impeller blades 32 propel the tailings in a tangential direction relative to the housing 33 and upwardly through the discharge opening 34 and into the lower side of the rethresher 42. When entering the rethresher housing 43, the tailings are generally evenly spread over its width. The rethresher rotor 46 deflects the stream of tailings in the direction of rotation 57 and causes the same to pass between the rasp bars 48 and the aggressive threshing surface 54 over the entire arcuate length of the latter, whereby they are submitted to a thorough rethreshing. The rasp bars 48 may be similar to the thresher bars used on the main threshing cylinder 14 so as to have a similar aggressive action on the tailings. As the rethresher rotor 46 according to the present invention does not have to propel the material directly into the cleaning means as in known arrangements, it can be designed solely with the function of rethreshing in mind and hence made to be as efficient as possible.

All tailings are subjected to rethreshing as the wall section 61 prevents material from being discharged prematurely to the impeller 63. As the tailings move over the inner surface of the cylindrical wall 44, they are deflected in a direction towards the impeller 63 by the fins 58 such that they leave the rethresher housing 43 in a circumferential spiral path and enter the impeller housing 66 through the opening 59. The impeller blades 64 are offset with respect to the rasp bars 48 as can be seen in FIG. 2, whereby the tailings are fluently taken over by the impeller blades 64 from the rethresher rasp bars 48. Finally, the impeller blades 64 propel the rethreshed tailings generally tangentially through the discharge opening 68 and into the discharge duct 70 and then the auger trough 71. The auger 72 further feeds the tailings along the trough 71 and discharges the same onto the grain-pan 22 for for recycling through the cleaning mechanism 7.

The impeller rotors 31, 63 are designed exclusively for throwing or impelling the tailings in a tangential direction and have no other function such as a rethreshing function, for example.

In a combine harvester or other harvesting machine constructed in accordance with the present invention, all components such as the thresher means and the separator means, for example, can be utilized to their maximum capacitor for which they have been designed and without any undue risk of being unevenly loaded and/or overloaded as a result of being supplied with unthreshed material or tailings. Jamming of these components as a result of tailings being supplied thereto is also avoided since the tailings are rethreshed in a separate structure. Thus, the threshing and separating efficiency of such machines are much improved.

Furthermore, the efficiency of the separate tailings rethresher means is also extremely high as a special structure has been provided combining an independent component which has been designed especially for rethreshing tailings and incorporating further independent components which have been designed especially for transporting the material. Thus, the tailings rethresher is not at all of a compromised design, as in known arrangements which employ a single component fulfilling a plurality of functions.

The efficiency of the rethresher is even further improved because, on the one hand, the tailings are fed to the rethresher generally tangentially and in a more or less even density over the full width thereof, and, on the other hand, all tailings must pass over the total length of the aggressive surface 54 before they can be discharged from the rethresher housing.

With the facility of designing the rethresher mechanism for the sole function of rethreshing, it has become possible to provide a stationary aggressive threshing surface which extends over an arcuate length of the rethresher housing which gives rise to a more thorough rethreshing action. Also, because of the provision of two independent impellers and an independent rethresher which can be positioned relatively close to each other and all driven in the same direction and at relatively high speeds, the tailings are passed continuously, fluently, and quickly through the various components without any substantial risk of jamming.

Whilst the efficiency of the rethresher is high, the cost of construction is relatively low since it is a simple structure with a very simple drive and most of the components may be produced from sheet metal.

MODIFICATIONS

In a modified design compared with that shown in the accompanying drawings, the auger conveyor 69 is dispensed with and replaced by a curved duct leading from the impeller discharge opening 68 to the grain pan 22.

I claim:
1. An agricultural harvesting machine comprising:
   a chassis,
   means mounted to the chassis for feeding crop material thereto,
   threshing, separating and cleaning means mounted to the chassis for threshing and separating grain from the crop material and for cleaning threshed and separated grain and for separating tailings from the clean grain,
   a cylindrical rethresher casing with a circumferential inlet opening,
   stationary rethresher means on the inner curved wall of the cylindrical rethresher casing downstream of the inlet opening, spiral conveyor fins on the inner curved wall of the cylindrical rethresher casing downstream of the stationary rethresher means, a first cylindrical impeller casing with a circumferential outlet opening and connected to the rethresher casing, a common wall between the rethresher casing and the first impeller casing with a transition opening therein at a location adjacent the spiral conveyor fins, a rethresher rotor rotatably mounted within the cylindrical rethresher casing cooperable with the stationary rethresher means to rethresh tailings supplied thereto, and cooperable with said fins to effect movement of the rethreshed tailings generally axially towards said transition opening in the common wall, the common wall at the location of the rethresher casing inlet opening and the stationary rethresher means serving as a shield preventing tailings from being discharged prematurely from the rethresher casing, a first impeller rotor mounted within the first impeller casing and coaxially with the rethresher rotor and adapted to receive rethreshed tailings from the rethresher rotor through the transition opening and to discharge the rethreshed tailings substantially tangentially through the impeller casing outlet opening, and transition means between the cleaning means and the rethresher casing for transferring tailings from the cleaning means to the rethresher casing.

2. An agricultural harvesting machine as described in claim 1 wherein the transition means comprise:

a tailings collecting auger mounted generally transversely below the cleaning means for collecting tailings therefrom and for conveying said tailings to one end, a further cylindrical impeller casing mounted coaxially with the tailings collecting auger at the discharge end thereof and having a circumferential outlet opening connected to the rethresher casing inlet opening, a further impeller rotor connected to the tailings collecting auger and mounted within said further impeller casing and adapted to receive tailings generally axially from the tailings collecting auger and to impel said tailings substantially tangentially through said outlet opening in the further impeller casing into the rethresher casing.

3. An agricultural harvesting machine as described in claim 2 further comprising a tailings collecting auger trough with the tailings collecting auger mounted therein and the trough flaring outwardly to the further impeller casing.

4. An agricultural harvesting machine as described in claim 2 wherein the tailings collecting auger drives the further impeller rotor, the rethresher rotor and the first impeller rotor.

5. An agricultural harvesting machine as described in claim 2 wherein the further impeller rotor, the rethresher rotor and the first impeller rotor are operable to raise the tailings from the bottom to the top of the cleaning means.

6. An agricultural harvesting machine as described in claim 1 wherein the stationary threshing means subtends an angle of at least 90° at the axis of the rethresher rotor.

7. An agricultural harvesting machine as described in claim 1 wherein the threshing members provided on the rethreshing rotor are in the form of rasp bars.

* * * * *